Oct. 24, 1967    A. WINKLER ETAL    3,348,461
ACCESSORY CLIP FOR PHOTOGRAPHIC CAMERAS
Filed April 9, 1965    2 Sheets-Sheet 1

*INVENTOR.*
ALFRED WINKLER
DIETER ENGELSMANN
FRANZ LANDBRECHT
OTFRIED RENNER

Michael J. Striker
Atty

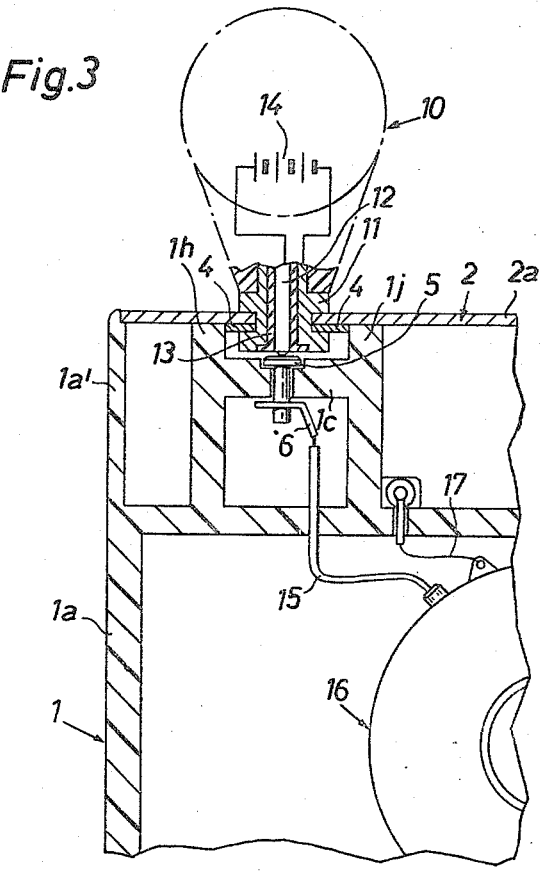

United States Patent Office 3,348,461
Patented Oct. 24, 1967

3,348,461
ACCESSORY CLIP FOR PHOTOGRAPHIC
CAMERAS
Alfred Winkler, Munich, and Dieter Engelsmann, Franz
Landbrecht, and Otfried Renner, Unterhaching, Munich, Germany, assignors to Agfa Aktiengesellschaft,
Leverkusen, Germany
Filed Apr. 9, 1965, Ser. No. 446,892
Claims priority, application Germany, Apr. 10, 1964,
A 21,561
13 Claims. (Cl. 95—11.5)

ABSTRACT OF THE DISCLOSURE

The housing of a photographic camera comprises a top part having an integral platform of plastic material. A U-shaped metallic cap is placed over the top part of the housing and comprises a top panel, a flat portion of which is formed with a rectangular cutout disposed above the platform and bounded by two parallel edge portions which are coplanar with the adjoining portions of the top panel. The platform and the edge portions form an accessory clip for the shoe of a flash unit or another attachment.

---

The present invention relates to photographic cameras. More particularly, the invention relates to an improved accessory clip which may be used in such cameras to accommodate the shoe of an attachment, such as a flash unit, a range finder or the like.

Heretofore known accessory clips are normally screwed, bonded or riveted to the housing or to the cover of a photographic camera. Such work is time-consuming and, furthermore, it is not always possible to mount the clip in an optimum position. For example, certain types of accessory clips form part of a finder housing which is inserted into the top portion of a camera so that the clip is located immediately above the viewfinder. Consequently, and when the clip accommodates the shoe of a flash unit, the latter is located directly above the opening of the viewfinder and might obstruct the field of view that the camera is taking.

Accordingly, it is an important object of the present invention to provide a very simple, inexpensive and versatile accessory clip which may be built into a photographic camera at any desired point of its cover portion so that the accessory or the attachment whose shoe is momentarily received in the clip need not obstruct the viewfinder or any other part of the camera which must remain accessible.

Another object of the invention is to provide an accessory clip which is constructed and assembled in such a way that nearly all of its components form part of the camera proper and may be produced in the same operation which is performed in shaping the corresponding part or parts of the camera.

A further object of the invention is to provide an accessory clip which is capable of receiving and engaging a shoe with such a force that the attachment which is connected to the shoe cannot wobble or become accidentally detached from the housing in normal use of the camera.

An additional object of our invention is to provide an accessory clip which, in addition to retaining a shoe, may also perform one or more additional functions, particularly of conducting electric current to certain parts of an attachment or to certain parts which are installed in the housing of a photographic camera.

Still another object of the invention is to provide housing for a photographic camera and to construct the housing in such a way that certain of its parts may constitute the components of our improved accessory clip.

A concomitant object of the invention is to provide a novel cover for a housing of the just outlined characteristics and to construct the cover in such a way that certain of its parts also constitute components of the improved clip and cooperate with the corresponding parts of the housing.

A further object of the invention is to provide an accessory clip which may be readily taken apart and reassembled with little loss in time, whose components need not be bonded, riveted or screwed to the housing of a photographic camera, and which may be provided in or on many types of candid cameras or other types of photographic equipment.

Still another object of the invention is to provide an accessory clip whose shoe-retaining action may be varied in a very simple way and which does not detract from the eye-pleasing appearance of a photographic camera.

Another object of the instant invention is to provide an accessory clip which is capable of fully concealing the shoe of an attachment and which is capable of properly retaining a shoe even though the latter happens to be smaller than necessary to completely fill the clip.

Briefly stated, one feature of our invention resides in the provision of a photographic camera which comprises a housing member preferably consisting of rigid synthetic plastic material and including a top portion provided with an integral platform, and a cover member including a top panel located at a level above and spaced from the platform. The cover member is formed with a substantially rectangular cutout extending into its top panel above the platform and this cover member comprises two elongated rail-shaped edge portions adjacent to the sides of the cutout and forming with the platform an accessory clip for the shoe of a flash unit or another attachment. The clip defines a shoe-receiving cavity which accommodates one or more retaining springs mounted in such position as to undergo deformation in response to insertion of a shoe whereby the attachment is held by friction. If the cavity of the clip accommodates two leaf springs, each such spring may be inserted between the platform and one of the rail-shaped edge portions, and the housing member and/or the cover member may be provided with recesses to receive portions of such springs so that each spring is anchored in the respective member.

In accordance with another feature of our invention, the attachment whose shoe is received in the cavity of the improved clip may be a flash unit which must be electrically connected with the synchronizer of the shutter mechanism in the lens mount of the camera. In such constructions, the spring may constitute a conductor which is connected to the negative pole of the battery in the flash unit and to a lead connecting to one terminal of the synchronizer. The positive pole of the battery is connected with a pin-shaped conductor which extends into the cavity of the clip and engages a centrally located contact. This centrally located contact may resemble a screw which is threaded into and through the platform of the housing member and is connected to a lead which is in circuit with the other terminal of the synchronizer. Of course, the centrally located contact must be properly insulated from that spring which is connected with the negative pole of the battery. Such spring contacts the shoe of the flash unit which consists of metallic material and forms part of the electric circuit for the synchronizer.

The novel features which are considered as characteristic of the invention are set forth in particular in the appended claims. The improved accessory clip itself, however, both as to its construction and the mode of assembling the same, together with additional features and advantages thereof, will be best understood upon perusal of the following detailed description of certain specific embodiments with reference to the accompanying drawings, in which:

FIG. 3 is a smaller-scale fragmentary section, substantially as seen in the direction of arrows from the line III—III of FIG. 2, and illustrates a slightly different accessory clip which accommodates the shoe of a flash unit.

Figure 1:
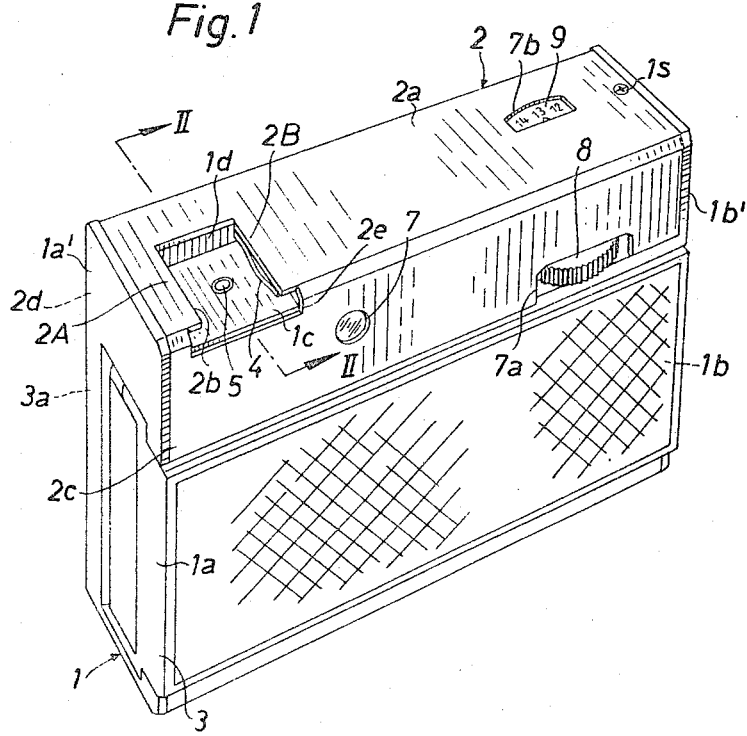
FIG. 1 is a perspective view of a candid camera comprising an accessory clip which is constructed in accordance with one embodiment of our invention.
Figure 2:
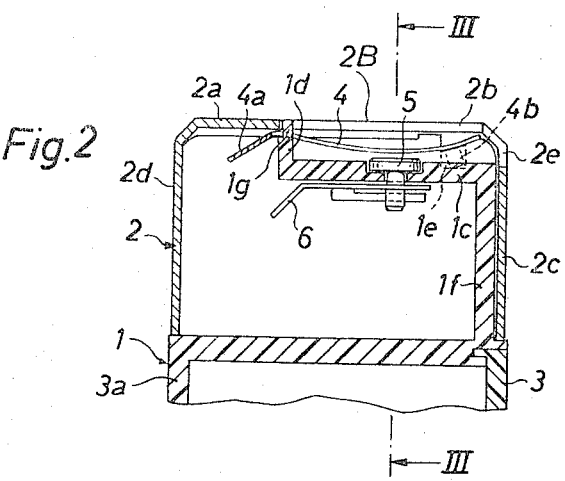
FIG. 2 is an enlarged fragmentary transverse vertical section as seen in the direction of arrows from the line II—II of FIG. 1.

Referring first to FIGS. 1 and 2, there is shown a photographic camera comprising a housing 1 consisting of rigid synthetic plastic material and connected with a cover 2 which consists of metallic sheet material and is detachably affixed to the housing 1 by screws 1s or similar fasteners. The housing 1 comprises a detachable or pivotable rear wall 3, a front wall 3a, and two side walls 1a, 1b having substantially rectangular upper end portions 1a', 1b' which extend beyond the upper edges of the walls 3, 3a. The cover 2 comprises a top panel 2a which extends between the upper edges of the portions 1a', 1b' and two depending panels 2c, 2d which extend between the corresponding vertical edges of the portions 1a', 1b'. The cover 2 resembles an inverted U-shaped body and its exact construction is disclosed in the copending application Ser. No. 434,995 of Alfred Winkler et al., filed Feb. 24, 1965 and entitled "Housing for Photographic Cameras."

The top panel 2a of the cover 2 is provided with a rectangular top cutout 2b which is adjacent to the rear panel 2c, and this latter panel is formed with a rear cutout 2e which is somewhat wider than the cutout 2b and communicates therewith. The width and height of the cutout 2e correspond substantially to the width and height of a customary shoe for an attachment to the camera so that such shoe may be pushed beneath the retaining edge portions or rails 2A, 2B of the top panel 2a which are adjacent to the lateral sides of the top cutout 2b. Thus, the distance between the rails 2A, 2B is selected in such a way that the edges of a shoe are engaged by the inner sides of the rails and the shoe cannot be withdrawn through the top cutout 2b.

Of course, and in order to make sure that the shoe which is introduced through the rear cutout 2e will remain in abutment with the undersides of the rails 2A, 2B, the interior of the cover 2 must accommodate a suitable bottom wall on which the shoe rests and which cooperates with the rails 2A, 2B to form therewith an accessory clip for a flash unit or the like. In accordance with a feature of the present invention, the bottom wall of the accessory clip is formed by a platform 1c which is integral with the housing 1 and is located in a horizontal plane at a level somewhat below the rails 2A, 2B. This platform 1c is located at the upper end of a vertical extension 1f of the housing 1 which is adjacent to the inner side of the rear panel 2c. The front edge of the platform 1c is integral with an upwardly extending portion or nose 1d which can abut against the underside of the top panel 2a and constitutes a stop for the front end of a shoe which is inserted into the accessory clip including the platform 1c and rails 2A, 2B.

The platform 1c is integral with the remainder of the housing 1 and may be formed by injection molding, especially if the housing consists of synthetic thermoplastic material.

A retaining leaf spring 4 is inserted into the space beneath the underside of the rail 2B and a portion of this spring normally bears against the upper side of the platform 1c. The spring 4 is deformed by the corresponding edge portion of a shoe which is inserted through the rear cutout 2e and moves toward and into abutment with the stop 1d. In the illustrated embodiment, the platform 1c is provided with a recess or socket 1e which receives the downwardly extending lug 4b provided at the rear end of the spring 4. The front end portion 4a of the spring 4 is bent downwardly and extends through an aperture or recess 1g provided in the stop 1d so that both ends of the spring are properly anchored in the housing 1. The purpose of the spring 4 is to frictionally engage a shoe and to prevent wobbling of the attachment whose shoe was inserted through the rear cutout 2e. The spring 4 is properly anchored before the cover 2 is attached to the housing 1, and the shape of this spring, in undeformed condition, is such that the spring undergoes at least some deformation when the cover 2 is fixed in position by screws 1s to make sure that the end portions of the spring respectively remain in the recess 1e and aperture 1g.

A very important advantage of the improved accessory clip is that it can be assembled in a very simple way, that it need not be machined as a separate unit, that all of its parts (with the exception of the spring 4) are integral with the wall structure of the camera, and that the spring 4 is automatically retained in operative position as soon as the cover 2 is properly affixed to the housing. Furthermore, merely by removing the cover 2 a defective spring may be readily replaced by a new spring. The entire accessory clip is located within the outlines of the cover 2 to allow for insertion of the camera into a simple carrying case. Many conventional accessory clips must be soldered, glued or riveted to the housing, and such work adds considerably to the initial cost of the camera.

FIG. 1 further shows a window 7 which is provided in the rear panel 2c and allows for observation of the field of view, a knurled wheel 8 which extends through a cutout 7a of the rear panel 2c and forms part of the film transporting mechanism, and a graduated scale 9 which is located behind a window 7b provided in the top panel 2a and cooperates with a fixed marker on the top panel to indicate the number of exposures.

In accordance with another advantageous feature of our invention, the accessory clip may accommodate and/or form part of contacts for a flash unit. One of the contacts is the so-called central contact and includes a metallic screw 5 whose head is recessed into the upper side of the platform 1c. The other contact is formed by the spring 4 whose median portion may be engaged by the metallic shoe 11 of a flash unit 10 shown in FIG. 3. The shoe 11 is connected with the negative pole of a battery 14 which is accommodated in the flash unit 10. The positive pole of the battery 14 is connected with a pin-shaped conductor 12 which extends through the shoe 11 into abutment with the head of the screw 5 and is surrounded by an insulating sleeve 13. The stem of the screw 5 is connected with a contact 6 which is located at the underside of the platform 1c and which is connected to a lead 15 serving to conduct current to one terminal of a synchronizer 16 in the shutter of the lens mount. The other terminal of the synchronizer 16 is connected with a lead 17 which is connected with the negative pole of the battery 14 through the intermediary of the front end portion 4a of one of the springs 4 and shoe 11.

It is clear that the provision of the central contact 5, 6 and leads 15, 17 constitutes an optional feature of our invention. The accessory clip 1c, 1d, 2A, 2B, 4 can be used with equal advantage to support other types of attachments, for example, a viewfinder or the like. Futhermore, and if the housing 1, or at least its platform 1c, consists of non-insulating material, the screw 5 may be inserted into a sleeve of insulating material which is embedded in the platform 1c. Also, the lug 4b of a spring 4 need not extend into the recess 1e but can merely abut against the underside of the rail 2A or 2B. It is further obvious that each spring 4 may be replaced by one or more layers of elastomeric material or that the accessory clip may comprise two leaf springs 4 (see FIG. 3), one for each of the rails 2A, 2B. Actually, the sole difference between the clips of FIGS. 1–2 and FIG. 3 is that the latter comprises two retaining springs 4. FIG. 3 also shows that the housing 1 comprises upwardly extending flanges 1h, 1j which surround the sides of the cavity in the accessory clip. It is clear that the springs 4 may be anchored in the flanges 1h, 1j and/or in the cover 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a photographic camera, a combination comprising a housing member including a top portion provided with an integral platform; a cover member including a top panel having a flat portion located at a level above and spaced from said platform, said cover member having a substantially rectangular cutout extending into said flat portion of the top panel above said platform and said flat portion comprising a pair of edge portions adjacent to the sides of said cutout and forming with said platform an accessory clip for the shoe of an attachment, said edge portions and said cutout and the remainder of said flat portion being located in a common plane; and electric contact means mounted on said platform, said contact means having conductor means located below said platform.

2. A combination as defined in claim 1, wherein said housing member consists of rigid synthetic plastic material.

3. A combination as defined in claim 1, wherein said cover member is U-shaped and further comprises a rear panel extending downwardly from said top panel and having a second cutout whose width exceeds the width of said first named cutout, said cutouts being in communication so that the rear ends of said edge portions overlie the lateral ends of said second cutout, the shoe of an attachment being insertable and removable through said second cutout, and further comprising at least one spring provided in said clip in such position as to undergo at least some deformation in response to insertion of a shoe into said clip.

4. A combination as defined in claim 3, further comprising a stop extending upwardly at the front end of said clip to arrest the shoe in requisite position.

5. A combination as defined in claim 4, wherein said stop is integral with said platform and wherein said housing member with the inclusion of said platform consists of rigid synthetic plastic material, said cover member consisting of metallic sheet material and being detachably affixed to said housing member.

6. A combination as defined in claim 1, wherein said cover member consists of metallic material.

7. A combination as defined in claim 6, wherein said edge portions constitute two rails and said cover member has a second panel extending downwardly from said top panel and adjacent to one end of said platform, said second panel having a second cutout whose width exceeds the width of said first named cutout and which communicates with said first named cutout so that one end of each rail overlies the respective lateral end of the second cutout, the shoe of an attachment being insertable and removable through said second cutout.

8. A combination as defined in claim 1, wherein said clip defines a shoe-receiving cavity and further comprising at least one retaining spring mounted in said cavity in such position that at least a portion thereof undergoes deformation in response to insertion of a shoe.

9. A combination as defined in claim 8, wherein said spring is inserted between said platform and one of said edge portions.

10. A combination as defined in claim 8, wherein one of said members is provided with at least one recess for a portion of said spring so that the spring is anchored in said one member.

11. A combination as defined in claim 10, wherein said spring comprises two end portions and said one member defines a pair of recesses each of which receives one of said end portions.

12. A combination as defined in claim 8, wherein the cavity of said accessory clip is arranged to accommodate the metallic shoe of a flash unit and wherein said spring consists of metallic material and is in current-conducting engagement with the shoe when the latter is inserted into said cavity, said contact means being electrically insulated from said spring, and further comprising a synchronizer having a pair of terminals and second conductor means connecting one of said terminals with said spring, said first named conductor means connecting said contact means with the other terminal.

13. A combination as defined in claim 12, wherein said platform consists of insulating material and said contact means is located substantially centrally between said edge portions.

References Cited

UNITED STATES PATENTS

| 2,278,173 | 3/1942 | Goering | 95—11 |
| 2,928,325 | 3/1960 | Harvey | 95—11.5 |
| 3,213,774 | 10/1965 | Curtiss | 95—11 |
| 3,286,612 | 11/1966 | Lieser | 95—11 |

FOREIGN PATENTS

| 1,145,472 | 3/1963 | Germany. |
| 912,942 | 12/1962 | Great Britain. |

NORTON ANSHER, *Primary Examiner.*

FRED L. BRAUN, *Assistant Examiner.*